US010775210B2

(12) United States Patent
Broadley et al.

(10) Patent No.: US 10,775,210 B2
(45) Date of Patent: Sep. 15, 2020

(54) INTERFACE DEVICES FOR USE WITH MEASUREMENT PROBES WITH ENHANCED FUNCTIONALITY

(71) Applicant: Broadley-James Corporation, Irvine, CA (US)

(72) Inventors: Scott T. Broadley, Laguna Beach, CA (US); Robert J. Garrahy, Laguna Niguel, CA (US); William E. Reynolds, IV, Irvine, CA (US); Bradley Joseph Sargent, Mission Viejo, CA (US); Jared H. Nathanson, Mission Viejo, CA (US); David J. Sargent, Mission Viejo, CA (US)

(*) Notice: Subject to any disclaimer, the term of this patent is extended or adjusted under 35 U.S.C. 154(b) by 364 days.

(21) Appl. No.: 15/923,935

(22) Filed: Mar. 16, 2018

(65) Prior Publication Data
US 2018/0266856 A1 Sep. 20, 2018

Related U.S. Application Data

(60) Provisional application No. 62/473,069, filed on Mar. 17, 2017.

(51) Int. Cl.
*G01D 18/00* (2006.01)
*G01D 3/02* (2006.01)

(52) U.S. Cl.
CPC ......... *G01D 18/008* (2013.01); *G01D 3/022* (2013.01)

(58) Field of Classification Search
CPC .................. G01D 18/008; G01D 3/022
See application file for complete search history.

(56) References Cited

U.S. PATENT DOCUMENTS

| 7,499,810 | B1* | 3/2009 | Walker | G01N 27/023 |
| | | | | 702/182 |
| 2012/0073989 | A1* | 3/2012 | Wilke | G01N 27/333 |
| | | | | 205/788.5 |

FOREIGN PATENT DOCUMENTS

| CN | 103542875 B | * | 9/2016 | .......... G01N 27/4165 |
| JP | H10-504643 A | * | 5/1998 | .............. G01D 3/00 |
| WO | WO-2016022756 A1 | * | 2/2016 | .......... G01F 23/2963 |

OTHER PUBLICATIONS

Rousseau et al, A Fully Automatic Calibration Procedure for Freehand 3D Ultrasound, 2002, IEEE, pp. 985-988 (Year: 2002).*

* cited by examiner

*Primary Examiner* — Mischita L Henson
(74) *Attorney, Agent, or Firm* — Knobbe, Martens, Olson & Bear, LLP

(57) ABSTRACT

Smart measurement probes may provide information regarding calibration data. However, an electronic instrument connected to such a smart measurement probe may be unable to fully utilize the capacities of the smart measurement probe. A measurement probe may be configured to provide information regarding calibration data to an instrument, but may not be able to take into account calibration settings of that instrument if that instrument lacks the capability to communicate that information to the smart measurement probe. To address such issues, an interface device may be connected between the smart measurement probe and the instrument, with the ability to generate simulated sensor outputs. A transmitter interrogation process utilizing these simulated sensor outputs may be used to determine the transmitter settings and provide an emulated sensor output emulating a previous sensor-transmitter pairing.

20 Claims, 10 Drawing Sheets

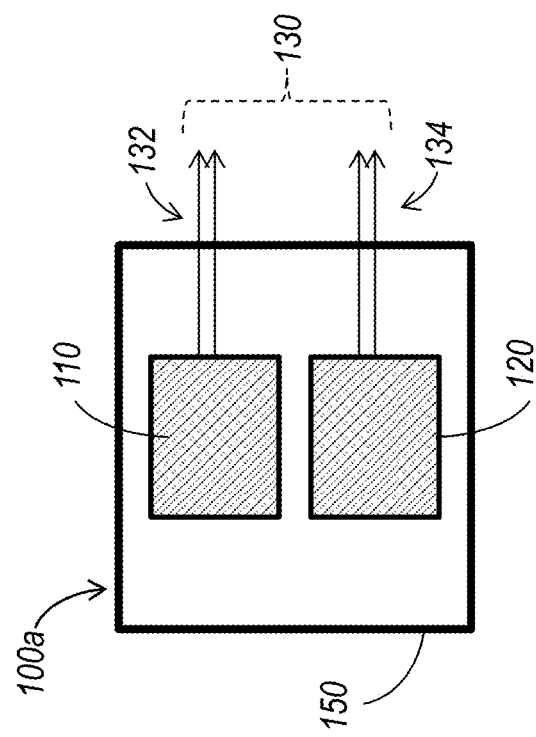
FIG. 1A
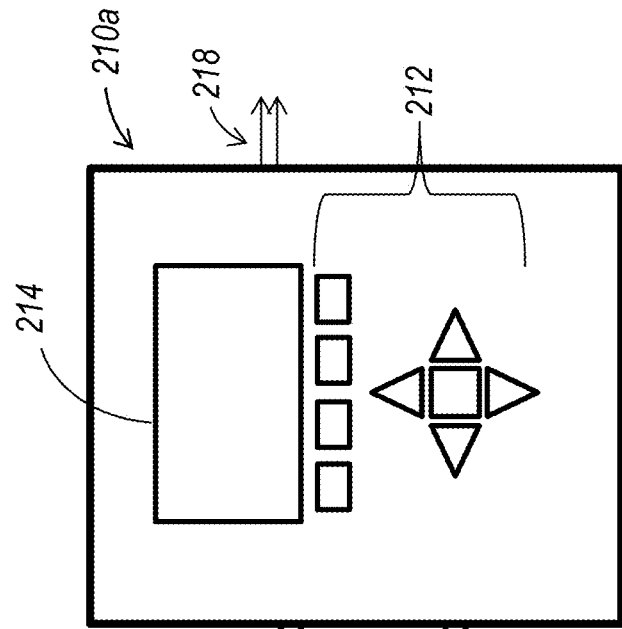
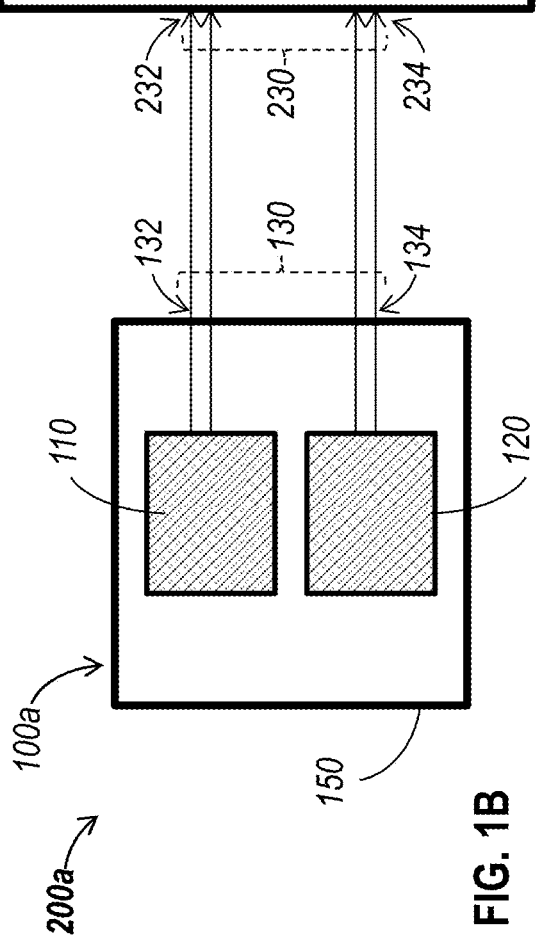
FIG. 1B

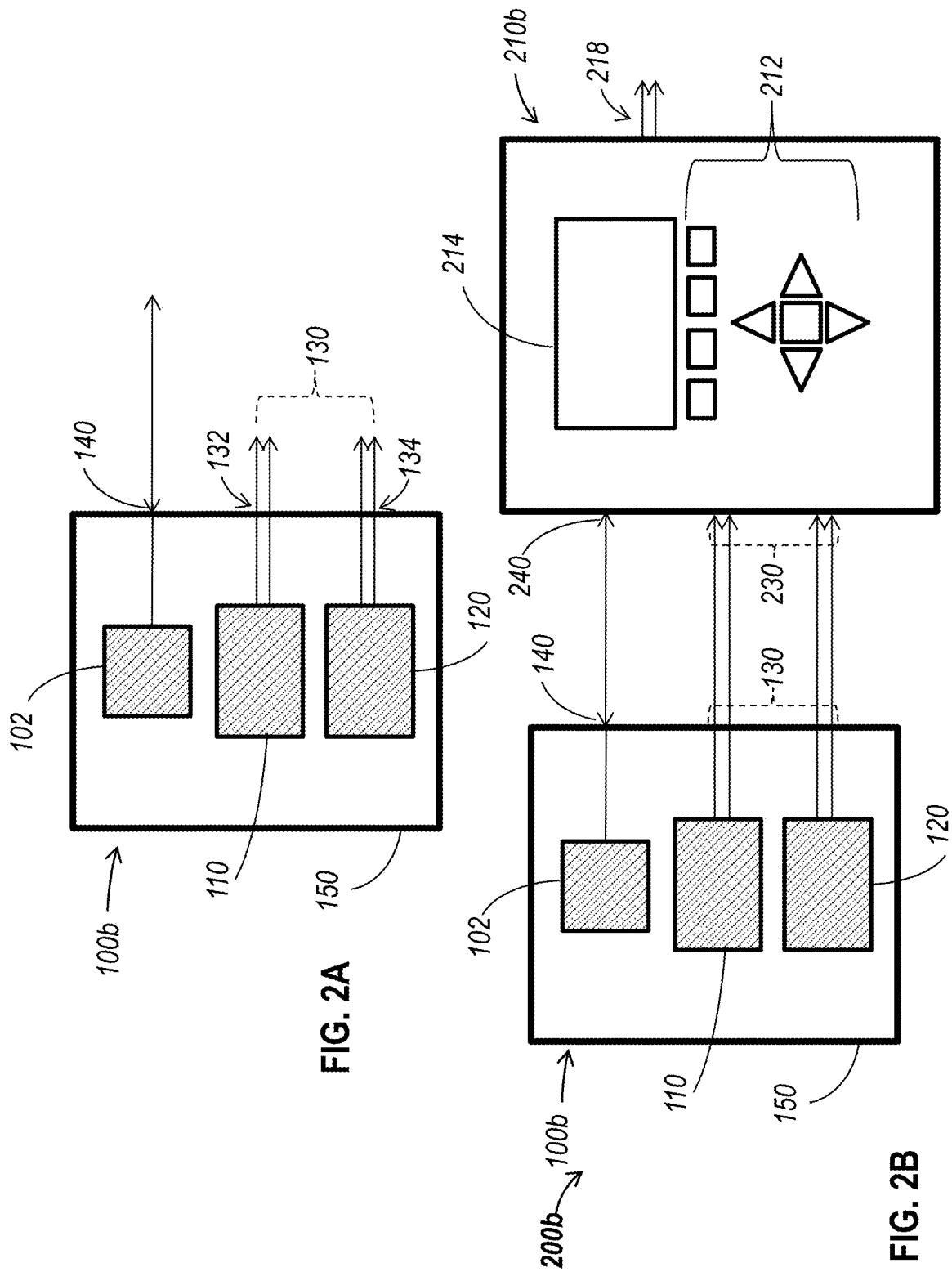

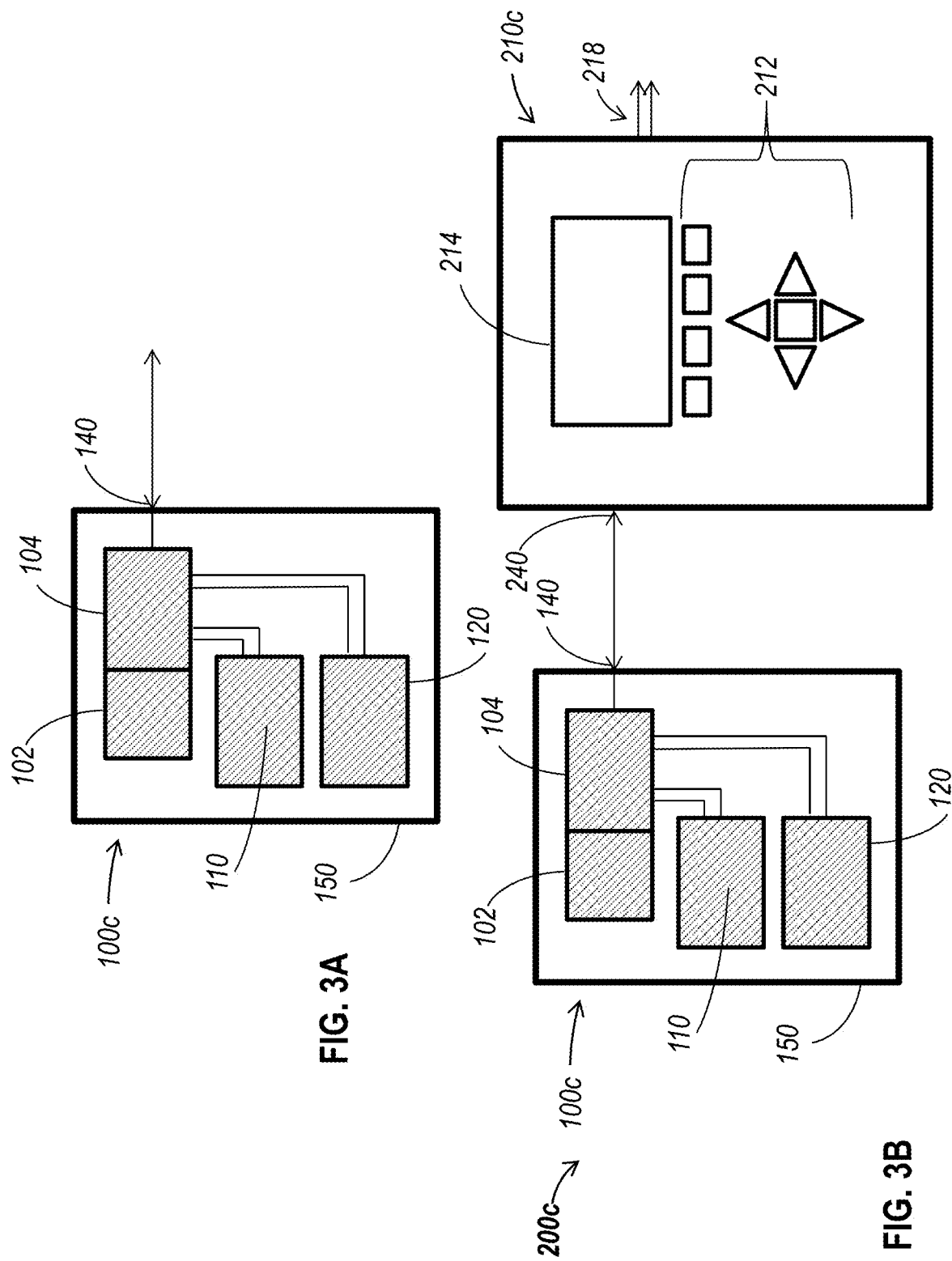

INTERFACE DEVICES FOR USE WITH MEASUREMENT PROBES WITH ENHANCED FUNCTIONALITY

CROSS-REFERENCE TO RELATED APPLICATIONS

This application claims priority to U.S. Provisional Application No. 62/473,069, filed Mar. 17, 2017, entitled INTERFACE DEVICES FOR USE WITH MEASUREMENT PROBES WITH ENHANCED FUNCTIONALITY, which is hereby incorporated by reference in its entirety.

BACKGROUND OF THE INVENTION

Field of the Invention

Embodiments described herein relate to measurement probes and associated devices, and in particular to interface devices for use with measurement probes.

Description of the Related Art

Measurement probes may be used in conjunction with an electronic instrument, commonly called a transmitter, to monitor industrial processes, and the information gathered using the probes may be utilized by a process control system. Due to the relative lifetimes of transmitters and measurement probes, many transmitters will remain operational for much longer than measurement probes with which they are used. As measurement probes may be more frequently replaced than transmitters, measurement probes often include newer features which cannot be utilized with older—but still operational—transmitters.

Some types of sensors now include electronic memory that can store the sensor's most recent calibration parameters as determined by appropriate instrumentation. This enables the sensors to be calibrated on one instrument and then used on another instrument without having to calibrate the other instrument. Some instruments write their calibration parameters to the sensor during the calibration process. When the sensor is subsequently connected to another instrument the previous calibration parameters are read from the sensors electronic memory and used by the new host instrument. In this way the new host instrument does not have to be re-calibrated with the new sensor. This is a major time saving feature to those industries who depend on many instruments connected to many sensors to control an industrial process.

However, there are many legacy instruments in the world that cannot read or write to the electronic memory of the newer sensors. Thus these legacy instruments cannot take advantage of the time-saving "Calibrate Here-Measure There" features of modern sensors.

SUMMARY OF THE INVENTION

In one embodiment, an interface device for use with a measurement probe and a transmitter is provided, the interface device including at least one input configured to receive a sensor signal from a measurement probe, a processor configured to generate a simulated sensor output signal for output to a transmitter, receive transmitter response information regarding the response of the transmitter to the simulated sensor output signal, determine, based on the transmitter response information, information regarding at least one transmitter setting, and generate an emulated sensor signal using the sensor signal and the information regarding the at least one transmitter setting, the emulated sensor signal configured to produce an accurate measurement at the transmitter without changing the at least one transmitter setting, and at least one output configured to output the simulated sensor output signal and the emulated sensor signal to the transmitter.

The at least one transmitter setting can include transmitter calibration information. The transmitter calibration information can be indicative of an expected sensor response for which the transmitter is calibrated, the expected sensor response differing from an idealized sensor response in at least one of offset and span, and the emulated output signal can be calibrated to emulate the expected sensor response. The processor can be additionally configured to receive sensor calibration information from the measurement probe, and generate the emulated sensor signal using the sensor calibration information in addition to the sensor signal and the transmitter calibration information. The processor can be additionally configured to convert the sensor signal to a calibrated sensor signal using the sensor calibration information, and generate the emulated sensor signal by converting the calibrated sensor signal to the emulated sensor signal using the transmitter calibration information. The processor can be further configured to convert the sensor signal to the emulated sensor signal using the sensor calibration information and the transmitter calibration information.

The device can include at least one input configured to receive the transmitter response information regarding the response of the transmitter to the simulated sensor output signal. The device can include a communications module in communication with the processor. The communications module can include a wireless transceiver configured to communicate with a separate computing device, and the communications module can be configured to receive the transmitter response information from the separate computing device. The communications module can include a wired connection configured to communicate with a separate computing device, and the communications module can be configured to receive the transmitter response information from the separate computing device.

The transmitter response information can include a plurality of transmitter measurements, each of the plurality of transmitter measurements in response to a different simulated output signal. The transmitter response information can include user input indicative of whether the transmitter response accurately reflects the simulated sensor output signal. The emulated sensor signal can be configured to produce an accurate measurement at the transmitter indicative of the sensor signal.

In another embodiment, an interface device for interrogating a transmitter is provided, the device including a processor configured to generate a plurality of simulated sensor output signals, each of the plurality of simulated sensor output signals corresponding to a different sensor condition, and determine at least one transmitter calibration condition based on information regarding the responses of a transmitter to each of the plurality of simulated output signals, and an output for transmitting each of the plurality of simulated output signals to the transmitter.

The device can include an input for receiving a sensor signal, wherein the processor is additionally configured to generate an emulated sensor signal based upon the at least one transmitter calibration condition. The device can be configured to transmit the emulated sensor output signal to the transmitter. The device can include a second input for receiving sensor calibration data, where the module can be configured to convert the sensor signal to a calibrated sensor signal based on the sensor calibration data and generate the emulated sensor signal by converting the calibrated sensor signal to the emulated sensor signal based upon the at least one transmitter calibration condition.

The device can include a transceiver for wirelessly receiving, from a separate computing device, the information regarding the responses of the transmitter to each of the plurality of simulated output signals. The information regarding the responses of the transmitter to each of the plurality of simulated output signals can include transmitter measurements in response to each of the plurality of simulated output signals.

In another embodiment, a method of calibrating an interface device for use with a transmitter is provided, the method including generating a plurality of simulated sensor output signals, outputting each of the plurality of simulated sensor output signals to a transmitter, receiving information regarding the response of the transmitter to each of the plurality of simulated sensor output signals, and determining at least one transmitter setting based upon the information regarding the response of the transmitter to each of the plurality of simulated sensor output signals.

Receiving information regarding the response of the transmitter to each of the plurality of simulated sensor signals can include receiving a plurality of measurements generated by the transmitter in response to the plurality of simulated sensor signals. The plurality of measurements generated by the transmitter in response to the plurality of simulated sensor signals can be received from a separate computing device. The separate computing device can include a smartphone, and the information regarding the response of the transmitter to the plurality of simulated sensor signals can be wirelessly received from the smartphone. The method can additionally include receiving a sensor signal from a connected measurement probe, converting the sensor signal based at least upon the at least one transmitter setting to generate an emulated sensor signal, and outputting the emulated sensor signal to the transmitter.

In another embodiment, an interface device configured for use with a transmitter configured to convert a sensor signal to a calibrated sensor signal based on transmitter calibration information is provided, the interface device including a processor configured to generate an emulated sensor signal based on the transmitter calibration information, the emulated sensor signal having a non-ideal span such that conversion of the emulated sensor signal by the transmitter using the transmitter calibration information will result in a calibrated sensor signal having an ideal span, and an output configured to output the emulated sensor signal to the transmitter.

The emulated sensor signal can have a non-zero offset. Conversion of the emulated sensor signal by the transmitter using the transmitter calibration information can result in a calibrated sensor signal calibrated to an idealized response. The emulated sensor signal can be calibrated to an expected input scale of the transmitter.

BRIEF DESCRIPTION OF THE DRAWINGS

FIG. 1A schematically illustrates an embodiment of a measurement probe.

FIG. 1B schematically illustrates an embodiment of a system in which a measurement probe such as the measurement probe of FIG. 1A is used in conjunction with a transmitter.

FIG. 2A schematically illustrates an embodiment of a hybrid smart probe.

FIG. 2B schematically illustrates an embodiment of a system in which a measurement probe such as the measurement probe of FIG. 2A is used in conjunction with a transmitter.

FIG. 3A schematically illustrates an embodiment of a smart probe.

FIG. 3B schematically illustrates an embodiment of a system in which a measurement probe such as the measurement probe of FIG. 3A is used in conjunction with a transmitter.

DETAILED DESCRIPTION OF THE PREFERRED EMBODIMENT

Figure 4:
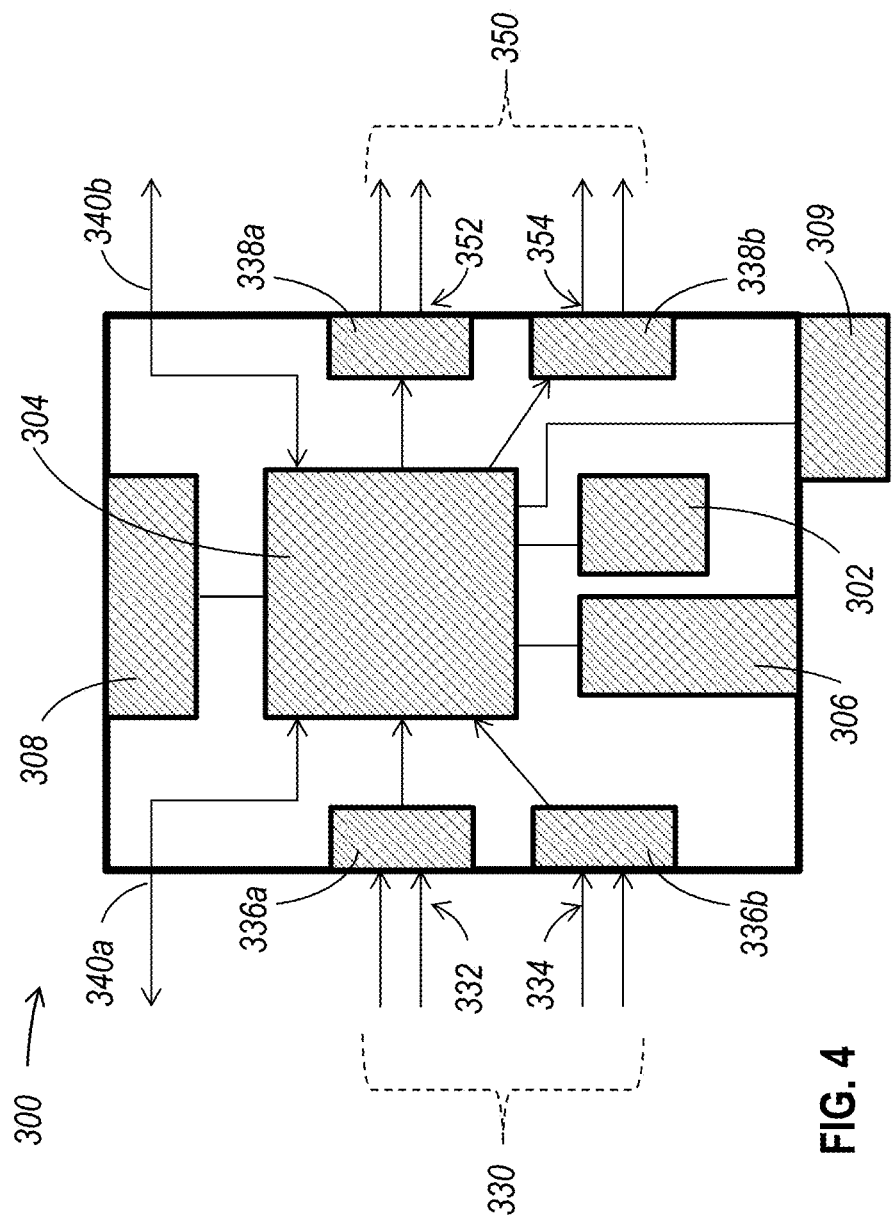
FIG. 4 schematically illustrates an embodiment of an interface device.

Disclosed herein are devices which can be used to retrofit older instruments so that they could be used with newer sensors that have electronic memory that stores calibration parameters. Embodiments of interface devices described herein can enable older legacy instruments to take advantage of the "Calibrate Here-Measure There" features of newer modern sensors. When such an interface device is connected to a legacy instrument, it enables the instrument to use pre-calibrated sensors with electronically stored calibration parameters, and correctly display the measurement values without the need to recalibrate the instrument every time a sensor is replaced. Such interface devices allow an industrial user to get many more years of use out of legacy instrumentation, without significant additional expense. The extended use of such legacy instruments can represent major savings to large enterprises in the chemical process, water and wastewater, and biopharmaceutical industries, among others.

A measurement probe may include one or more sensors configured to provide an output signal indicative of a measurement value of a medium or substance. The output signal may be a current or voltage indicative of a parameter measured by the measurement probe, or a signal that is otherwise representative of such a current or voltage. For example, the measurement probe may include one or more sensors configured to measure a pH value, a temperature, an oxygen level, a carbon dioxide ($CO_2$) level, or any other parameter. The output signal may be provided to a transmitter or other instrument, which may generate a measurement value in engineering units based on the output signal, or may otherwise process the output signal. The transmitter may also transmit one or both of the measurement or the output signal to another device, such as a control system.

Due to variances between individual sensors, exposure of two sensors to the same condition may result in different output signals. This variance from an ideal sensor response may take multiple forms. For a sensor having a generally linear response, or a response which is linear over a given range, the variance can be characterized by an offset value and a span value. For example, a condition which would be expected to yield a zero response from a sensor may instead yield a non-zero response. This offset may be taken into account by adjusting the signal by a fixed offset when converting the output signal to a measurement. In addition, the change in the output signal for a given change in the condition being measured may differ from the response of an ideal sensor. This variance may be taken into account by altering the span or multiplier used in converting an output signal to a measurement. With information regarding the span and offset of a given sensor, a more accurate measurement of the condition measured by the sensor can be obtained.

One calibration relationship between the calculated measurement and an output voltage of a sensor may be defined as follows:

$$M=(V_{Out}-V_{Offset})/\text{Slope}+X,$$

where M is the measurement of the condition being measured, $V_{Out}$ is the output signal of the sensor, $V_{Offset}$ is an offset voltage indicative of the sensor offset, Slope characterizes the linear relationship between the measurement and the raw output voltage, and X is a calibration constant which defines the measurement corresponding to a zero output voltage. The linear relationship between the sensor output and the measured condition may be defined using other suitable parameters, as well. For example, the calibration data may be provided in terms of offset and span, where a span adjustment is used to change the slope of output signal to measured value. Non-linear relationships between sensor outputs and the measured condition may be defined, as well, for sensors which have non-linear responses to variances in the measured condition.

FIG. 1A schematically illustrates an embodiment of a measurement probe. The measurement probe 100a includes a principal measurement sensor 110, which may be a photovoltaic sensor or another sensor configured for use in the measurement of a parameter. In various embodiments of measurement probes, the principal measurement sensor 100 may be configured to measure one of a variety of process parameters. For example, in various embodiments, the measurement probe 100a may be configured for use as a pH sensor, a carbon dioxide sensor, or a dissolved oxygen sensor, among others. The measurement probe 100a also includes a temperature sensor 120, such as a resistance temperature detector (RTD). The measurement probe 100a can transmit signals to other components, such as a transmitter, via outputs such as analog output 130 in electrical communication with the sensor 110. In some embodiments, the analog output 130 may include a first analog output 132 configured to output a signal from the principal measurement sensor 110, and a second analog output 134 configured to output a signal from the RTD sensor 120.

The measurement probe 100a may have additional components or features specific to certain applications. The housing 150 may include, for example, features configured to selectively expose certain sensors to a medium to allow periodic monitoring of the medium. The housing 150 may also include structural components which allow support or securement of the measurement probe 100a within a medium to be monitored, or within another process component.

FIG. 1B schematically illustrates an embodiment of a system in which a measurement probe such as the measurement probe of FIG. 1A is used in conjunction with a transmitter. The system 200a includes the probe 100a and a transmitter 210a. The output 130 of the probe 100a is electrically connected to the input 230 of the transmitter 210a. In particular, the first analog output 132 is electrically connected to a first analog input 232 of the transmitter 210a, and the second analog output 134 is electrically connected to a second analog input of the transmitter 210a. In the illustrated embodiment, the transmitter 210a includes a display 214 and an input mechanism 212, which can be used to view and change the settings of the transmitter 210a. The transmitter 210a may also include one or more outputs 218 for transmitting information from the measurement probe to another device, such as a control system.

Due to variances between individual measurement probes, calibration data for the specific measurement probe 100a may be used in conjunction with the output(s) of the measurement probe 100a for the transmitter to calibrate the output of the measurement probe 100a to a desired scale of engineering units for accurate display on the transmitter and re-transmitted by the transmitter to the process controller.

Figure 8A:
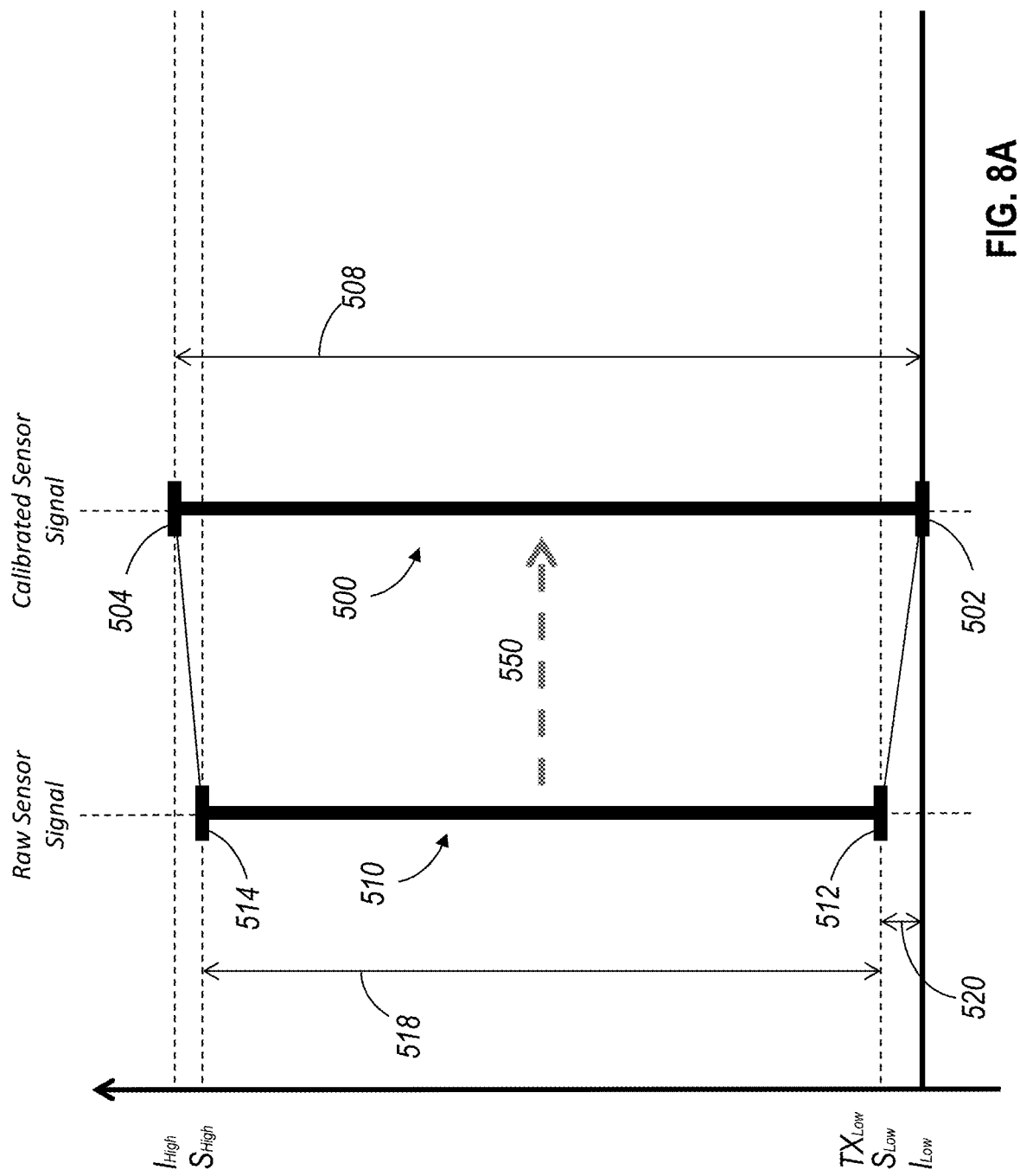
FIG. 8A is a representation of the actual output of a sensor and the output of an ideal sensor, illustrating the use of span and offset settings which can be used to calibrate the raw output signal of the sensor.

FIG. 8A is a representation of the actual as-found raw output of a sensor and the output of a theoretically ideal sensor, illustrating the use of span and offset settings which can be used to calibrate the raw output signal of the sensor. FIG. 8A illustrates a response 500 representing a range of responses of a theoretically ideal sensor to a range of conditions, ranging from a low idealized output $I_{Low}$ at the lower end 502 of the response range 500 to a high idealized output $I_{High}$ at the upper end 504 of the response. The idealized response 500 to the range of conditions spans an idealized output range 508 which may be calculated by subtracting the low idealized output $I_{Low}$ from the high idealized output $I_{High}$.

The plot also illustrates the as-found response 510 of an actual sensor to the same range of conditions, ranging from a low actual sensor output $S_{Low}$ at the lower end 512 of the response 510 to a high actual sensor output $S_{High}$ at the upper end 514 of the response. The response 510 of an actual sensor differs from the idealized response 500 due to variances in the manufacture of individual sensors. The range of actual sensor outputs to the range of conditions spans an actual sensor output range 518 which may be calculated by subtracting the low actual sensor output $S_{Low}$ from the high actual sensor output $S_{High}$.

As illustrated in the plot of FIG. 8A, calibration of the sensor output can be represented as a conversion process 550 that uses calibration parameters to map or convert a raw sensor signal of a sensor having an actual as-found response 510 to the corresponding values of the idealized response 500 in order to generate a calibrated sensor signal. The relationship between the actual responses and the idealized responses may be defined using a variety of calibration parameters and algorithms. In some embodiments, in the case of a potentiometric sensor, an offset voltage and a span correction may be used to convert the sensor's raw as-found voltage output 510 to the idealized sensor voltage output 500. The offset voltage may be defined, for example, as the difference between the low actual sensor output $S_{Low}$ and the low idealized output $I_{Low}$. In practice, the ideal offset is often defined as zero, "0", volts. Actual sensors may have an offset voltage that has a non-zero value and can have a positive or negative value. Similarly, in the case of sensors with linear response, the span correction may be defined as the ratio between the actual output range 518 and the idealized output range 508. In some embodiments, at a minimum, the offset and span of the sensor must be determined in order for the non-ideal scale of the raw sensor signal to be converted to an ideal scale of engineering units that can accurately represent the condition or quantity being sensed and measured by the sensor. In some embodiments, this calibration process may be performed by a device connected to a probe, such as a transmitter. In some embodiments, as discussed in greater detail below, a probe may include components which allow calibration of a raw sensor signal, so that the probe can directly output a calibrated sensor signal In an embodiment such as the system of FIG. 1B, the calibration of the measurement probe 100a may be accomplished by altering the settings of the transmitter 210a using input mechanism 212, although other embodiments of transmitters 210a may be updated in other ways, such as via a wired or wireless connection with another control device. Calibration data may include, but is not limited to, span and offset calibration settings that are inputted into the transmitter or calculated by the transmitter by user command prompts and actions and that are specific to the probe currently attached to the transmitter. As discussed above, these parameters may be used to correct for variances in the output of the sensor, at least over a particular operating range of the sensor.

In some embodiments, the signal calibration information, such as offset and span, may be generated by exposing the measurement probe 100a to known conditions or calibration standards, and the settings of the transmitter 210a adjusted to correlate the provided signals with the known values of the conditions or calibration standards. In other embodiments, the calibration process may be performed independent of the transmitter 210a, and the calibration data, such as offset and span, is recorded or otherwise stored. The calibration data is then used to adjust the settings of the transmitter 210a when the measurement probe 100a is connected to the transmitter 210a. In some embodiments of the measurement probes discussed below, this calibration data may be stored electronically in a memory circuit of a hybrid sensor 100b (see FIG. 2A, for example).

As the measurement probe 100a only provides raw analog measurement signals from the principal measurement sensor 110 and temperature sensor 120, the measurement probe 100a requires manual calibration of the paired transmitter 210a in order to calibrate the as-found raw signal provided by the measurement probe 100a to the desired accurate scale of engineering units to be displayed and re-transmitted by the transmitter. In some embodiments of potentiometric sensors, the information obtained during the calibration procedure for the measurement probe 100a is the probe's offset and span correction information. This calibration information can be stored as electronic data in the transmitter 210a. Similarly, as the transmitter 210a is only configured to receive the raw analog signals from the measurement probe 100a, the transmitter 210a requires calibration with the probe 100a attached to provide a calibrated measurement in the desired engineering units based on the signals from the measurement probe 100a.

Figure 8B:
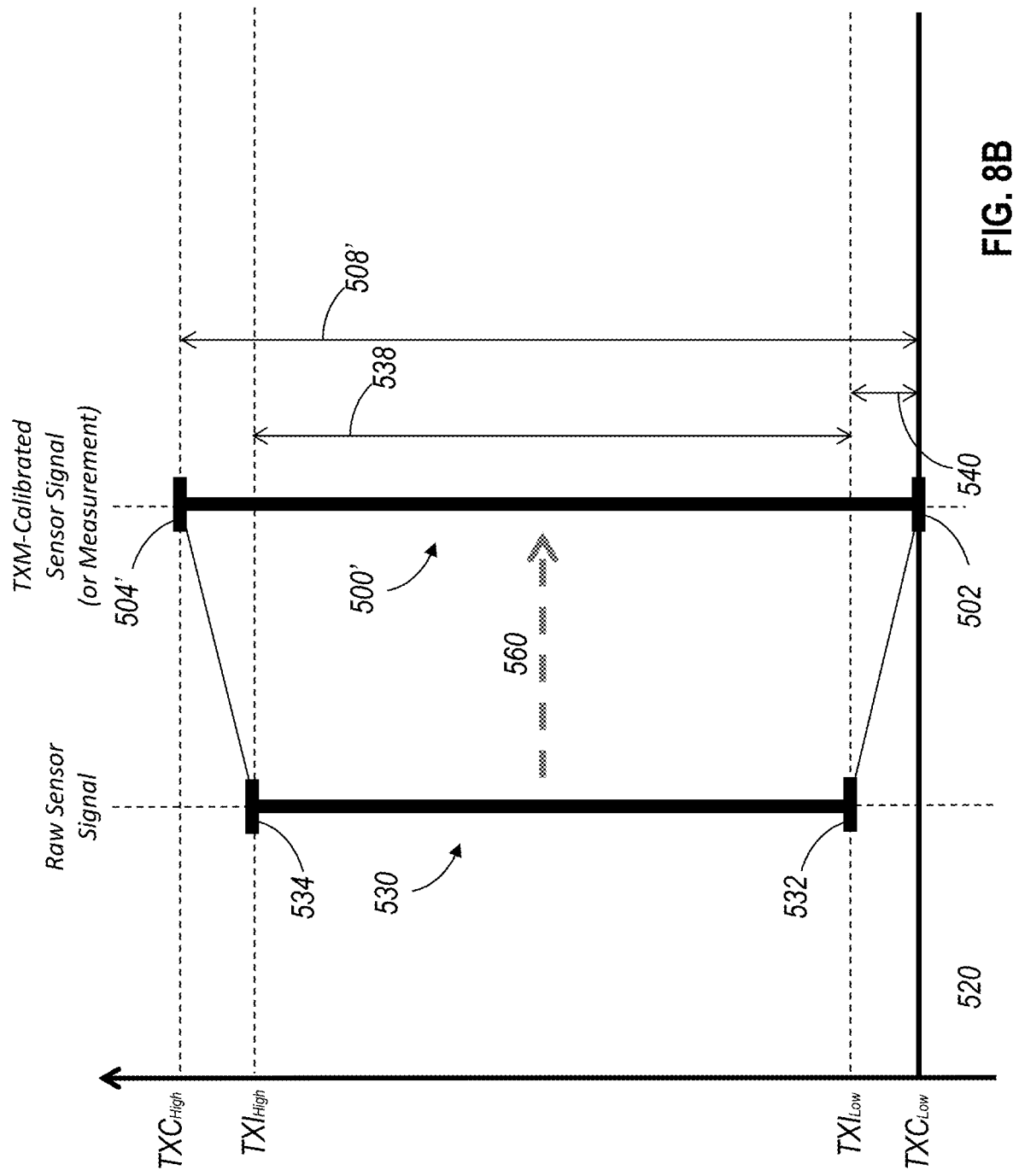
FIG. 8B is a representation of transmitter calibration of a raw output signal of a sensor.

FIG. 8B is a representation of the use of calibration information by a transmitter. A transmitter display and output may be calibrated, ie. its calibration settings adjusted, for a connected probe having a non-zero offset value and a non-ideal span. The connected probe may be configured to provide a raw sensor signal having a response 530. When the transmitter is connected directly to a probe, or otherwise receives a raw or uncalibrated output signal from a probe, the transmitter may apply the signal calibration settings to calibrate the signal, enabling the transmitter to accurately calculate, analyze, and display the correct and accurate measurement of the conditions to which the sensor is exposed.

Most probes with an analog sensor have a signal output with non-ideal offset and non-ideal span. Accordingly there is the need to adjust the calibration settings of a transmitter to accommodate and compensate for each probe's unique, non-ideal, offset and non-ideal span. As probes wear out and need replacement the transmitter will need to be recalibrated for each new probe that is connected to it. It follows that at any particular time, the transmitter will be configured to perform a conversion process 560 using the last calibration settings for the last probe it was connect to and calibrated with. Thus, the response 530 for which a given transmitter is calibrated will typically be the response of the last probe connected to the transmitter, and the transmitter calibration settings will have corrected the response 530 to produce the ideal measurement scale 500' Where the probe output response 530 differs from the idealized response 500', the transmitter will modify the received raw sensor signal from the probe in a conversion process 560 based on those transmitter calibration settings prior to or as part of the conversion of the received signal to engineering units in a measurement process. The conversion process 560 uses calibration parameters to convert or map as-found sensor signals with response 530 to corresponding signals or values on an ideal measurement scale 500'. In some embodiments, the raw sensor signal from a connected probe may be corrected, or otherwise mathematically transformed by the transmitter to an idealized scale 500' and subsequently converted to engineering units. In other embodiments, the transmitter may convert or map a sensor signal with an as-found response 530 directly to engineering units with an ideal scale 500'. In some embodiments, the transmitter may output the converted signal in addition to or in place of the display of the measurement in engineering units.

The transmitter settings can be configured to provide an accurate measurement in response to receiving raw sensor signals with an as-found sensor response scale 530 which ranges from a low expected output $TXI_{Low}$ at the lower end 532 of the as-found sensor response scale 530 to a high expected output $TXI_{High}$ at the upper end 534 of the as-found sensor scale 530. The offset transmitter setting is indicative of the difference between the low as-found probe output $TXI_{Low}$ and a signal or value corresponding to the low idealized calibrated signal $TXC_{Low}$ of the ideal measurement scale 500'. In the case of a sensor with linear response the span correction setting represents the ratio between the as-found probe output range 538 and the idealized measurement range and scale 508', which ranges from a signal or value corresponding to a low idealized calibrated signal $TXC_{Low}$ at the lower end 502' of the measurement to a signal or value corresponding to a high idealized calibrated signal $TXC_{High}$ at the upper end 504' of the idealized measurement scale 500'.

With continued decreases in the cost and size of electronic components, various electronic components may be incorporated into the design of measurement probes to provide additional capabilities. A measurement probe including additional components or features beyond sensors with raw analog outputs may generally be referred to herein as a smart probe, although a wide range of features and components may be incorporated into various embodiments of smart probes.

In certain embodiments of smart probes, one or more additional components may be included which operate independently of the sensors to provide additional functionality to the measurement probe. These smart probes may provide additional outputs and/or features which do not directly affect the raw analog sensor output of the measurement probe. Such a measurement probe may be referred to herein as a hybrid smart probe. In some embodiments, the information stored within the measurement probe and transmitted to the transmitter may include calibration data for the probe's principal measurement sensor. In some embodiments, the information stored and transmitted may include metadata for the probe, such as the type of probe, the date of manufacture, usage history, or any other suitable information.

FIG. 2A schematically illustrates an embodiment of a hybrid smart probe. The hybrid smart probe 100b is similar to the measurement probe 100a of FIG. 1A, including a principal measurement sensor 110, a temperature sensor 120, and an analog output 130. However, the smart probe 100b also includes at least one memory circuit 102 in communication with a digital I/O port 140.

The memory circuit 102 may be configured to store information and communicate that information to a transmitter or other device. As discussed above, the memory circuit 102 may store calibration data for the hybrid smart probe 100b. The memory circuit 102 may also include, for example, identifying information regarding the hybrid smart probe 100b, such as the date and location of manufacture, or any other data which may be stored in the memory circuit 102 by a manufacturer or user. Communication of the data stored in the memory circuit 102 may be accomplished via the digital I/O port 140 or another communication component distinct from the analog sensor output 130 of the measurement probe. In some embodiments, the digital I/O port 140 may provide bidirectional communication, allowing information to be written to the memory circuit 102 in addition to allowing information to be read from the memory circuit 102. In some embodiments, the digital I/O port 140 may provide power to the memory circuit 102, as well as to other components of the hybrid smart probe 100b.

To utilize the additional information provided by a smart sensor such as the hybrid smart probe 100b, the information must be received by a "smart" transmitter or other device within a measurement or control system which is configured to receive a digital signal and is capable of utilizing that additional information. FIG. 2B schematically illustrates an embodiment of a system in which a measurement probe such as the measurement probe of FIG. 2A is used in conjunction with a smart transmitter. The system 200b includes probe 100b in communication with a smart transmitter 210b. In addition to the analog input(s) 230 of the smart transmitter 210b, the smart transmitter also includes a digital I/O port 240 which can be used to receive information from memory circuit 102 of hybrid smart probe 100b. The digital I/O port 240 may also be bidirectional, and may allow writing of information to the memory circuit 102.

The hybrid smart probe 100b may provide raw uncorrected output signals from the principal measurement sensor 110 and temperature sensor 120 via analog output 130 to the analog input 230 of the transmitter 210b. In addition, information such as calibration data can be sent from the memory circuit 102 via the digital I/O port 140 and received by the transmitter 210b via the digital I/O port 240 of the transmitter 210b. The raw uncorrected signals may then be calibrated via the transmitter 210b in accordance with the calibration data. This calibration may include the use of the calibration data in converting the output signal of the hybrid smart probe 100b to a measurement value in the desired engineering units, or it may include correction of the signal itself based on the calibration data. In some embodiments the transmitter may display the now calibrated measurement value and transmit that measurement value to a process controller.

The sending of the calibration data need not be simultaneous with the sending of raw analog signals. For example, the calibration data can be sent to the transmitter 210b when the hybrid smart probe 100b is first connected to the transmitter 210b, and the settings of the transmitter 210b can be adjusted to calibrate the subsequently received uncorrected raw analog signals in the desired engineering units.

In other embodiments, smart probes may include components or features which process or modify in some way the signals generated by the sensors. FIG. 3A schematically illustrates an embodiment of a smart probe. The smart probe 100c includes, in addition to a memory circuit 102, a processor 104. The processor 104 is in communication with the memory circuit 102, and unlike the additional components of the hybrid smart probe 100b illustrated in FIG. 2A, is in communication with the principal measuring sensor 110 and the temperature sensor 120 within the smart probe 100c. The smart probe 100c may include analog-to-digital converters (ADCs, not shown) for converting the analog sensor output signals into digital signals for processing.

The smart probe 100c need not provide an analog output, but may instead provide a digital output via digital I/O port 140. A single signal output via digital I/O port 140 may be a composite signal representative of the calibrated outputs of multiple sensors. As discussed with respect to the hybrid smart probe 100b, the digital I/O port 140 may allow bidirectional communication, allowing information to be provided to the processor 104 and written to the memory circuit 102. The digital I/O port 140 may also be used to provide power to the smart probe 104 from a connected transmitter or other device.

The processor 104 may be used to calibrate the sensor output by determining and applying calibration parameters specific to the smart probe 100c. In so doing, the smart probe 100c can be configured to output an already-calibrated signal compensating for any offset values and deficient span characteristics of the measurement probe. Similar to the hybrid smart probe 100b, the smart probe 100c may be used in conjunction with a transmitter configured to receive a digital signal. In some embodiments, the digital signal may be representative of a digitalized version of the sensor's calibrated output signal, such as millivolts or milliamps, while in other embodiments, the processor 104 may convert the sensor raw output signal to a measurement in appropriate engineering units, and the digital signal may be representative of that measurement converted and calibrated in the appropriate engineering units.

FIG. 3B schematically illustrates an embodiment of a system 200c in which a measurement probe such as the measurement probe of FIG. 3A is used in conjunction with a smart transmitter. The transmitter 210c includes at least a digital I/O port 240 which can be used to receive a digital signal from the digital I/O port 140 of the probe 100c. The transmitter 210c may in some embodiments be similar to the transmitter 210b, and also include one or more analog inputs, such that the transmitter 210c may be configured to be operated in conjunction with some or all of measurement probe 100*a*, hybrid smart probe 100*b*, and smart probe 100*c*.

Because the relative lifetime of a measurement probe may be substantially shorter than the lifetime of a transmitter, a user may frequently need to replace a measurement probe many times over the lifetime of a transmitter. In addition, when a new measurement probe is needed for use with a legacy transmitter, smart probes with additional features may be available as potential replacements. However, if the legacy transmitter does not have the capability of receiving a digital signal in addition to or in place of analog signals, the possible additional utility of the smart probe will be lost, and some all-digital smart probes may not be usable at all with legacy transmitters with analog-only input.

In some embodiments, the smart probe 100*c* may be used in conjunction with a transmitter such as the transmitter 210*a* of FIG. 1B by providing a DAC between the processor 104 and the transmitter 210*a*. Converting the digital output signal of the smart probe 100*c* to an analog signal would provide a calibrated analog output signal to the transmitter 210*a*, where the analog output signal takes into account the calibration parameters specific to the smart probe 100*c*. However, in some embodiments, the as-found calibration settings currently in the transmitter 210*a* may alter the already calibrated signal of the smart probe, including additional and unnecessary offset and span adjustments prior to the measurement being displayed on the transmitter and/or transmitted to the process controller. In other words, the transmitter 210*a* may be configured to operate with as-found calibration settings appropriate for the last probe it was calibrated with. These transmitter settings, when applied to the signal from a new probe, may result in at least one of offset and span that differ from an idealized probe response scale 500'. In certain of these embodiments, it may be desirable for the offset and span settings of the transmitter 210*a* to remain at these as-found adjustments. Because the transmitter 210*a* is not capable of providing the transmitter's own offset and span information to the smart probe 100*c*, the probe's calibrated analog output signal cannot take the transmitter settings into account, and therefore the net result may be that an erroneous, miscalibrated measurement occurs at the display and in the output of the legacy transmitter.

FIG. 4 schematically illustrates an embodiment of a device, referred to herein as an interface device, which allows a smart probe to be used in conjunction with an unmodified legacy transmitter that may have any pre-existing offset and span parameters already on it. Interface device 300 is configured to form part of a connection between a measurement probe and a transmitter. The interface device 300 includes analog inputs 330 configured to receive analog output signals from a measurement probe, and a first digital I/O port 340*a* configured to receive a digital signal from a measurement probe. In the illustrated embodiment, the analog inputs 330 include a first analog input 332 and a second analog input 334.

The interface device also includes a processor 304 configured to condition and transform the signal or signals received from the measurement probe. A first analog-to-digital converter 336*a* is used to convert a signal received from the first analog input 332 to a digital signal before processing via the processor 304, and a second ADC 336*b* is similarly used to convert a signal received from the second analog input 334 to a digital signal. As the digital port 340*a* is configured to receive a digital signal from a smart probe, the digital signal can be provided directly to the processor 304 for processing and analysis.

The processor 304 is in communication with a memory circuit 302 and can be configured to condition and transform received signals in any of a variety of ways, as discussed in greater detail below. The conditioned and transformed signals may then be sent to a transmitter or other device via second digital port 340*b*, or analog outputs 350. In some embodiments, a first digital-to-analog converter 338*a* is used to convert a signal conditioned by the processor 304 to an analog signal which is then sent to a connected device via a first analog output 352, and a second signal conditioned by the processor 304 is converted via a second DAC 338*b* and sent to a connected device via a second analog output 354.

The interface device 300 also includes a memory circuit 302 in communication with the processor 304. In addition, the interface device also includes a communication module 306 for communication with an external control device. In some embodiments, the communication module 306 may include a wireless communication module, such as an antenna and transceiver configured to communicate via RF signals using a wireless protocol such as Wi-Fi, Bluetooth, NFC, or any other suitable communications protocol. In some embodiments, the communication module 306 may include a wired communication module or port for communicating with an external control device. The interface device 300 also includes a signal generator 308 in communication with the processor 304, the operation of which is discussed in greater detail with respect to subsequent figures. In some embodiments, a dedicated power supply 309 may be used to power the interface device 300, although in some implementations, power may also be provided via the digital I/O port 340*b*.

Although certain components of the interface device are illustrated as discrete components, the functions of certain of these components may be performed by other components. For example, in some embodiments, the signal generator 308 may be discrete circuitry controlled by the processor 304, while in other embodiments, the signal generator may be a software module executed on the processor 304, or some combination of hardware and software modules.

In the illustrated embodiment, the interface device contains a variety of inputs and outputs to allow use in multiple applications. The particular inputs and outputs used for a given application may depend on the type of sensor and the type of transmitter to which the interface device is attached. In some embodiments, specialized interface devices may include fewer inputs and/or outputs than those shown here.

Figure 5:
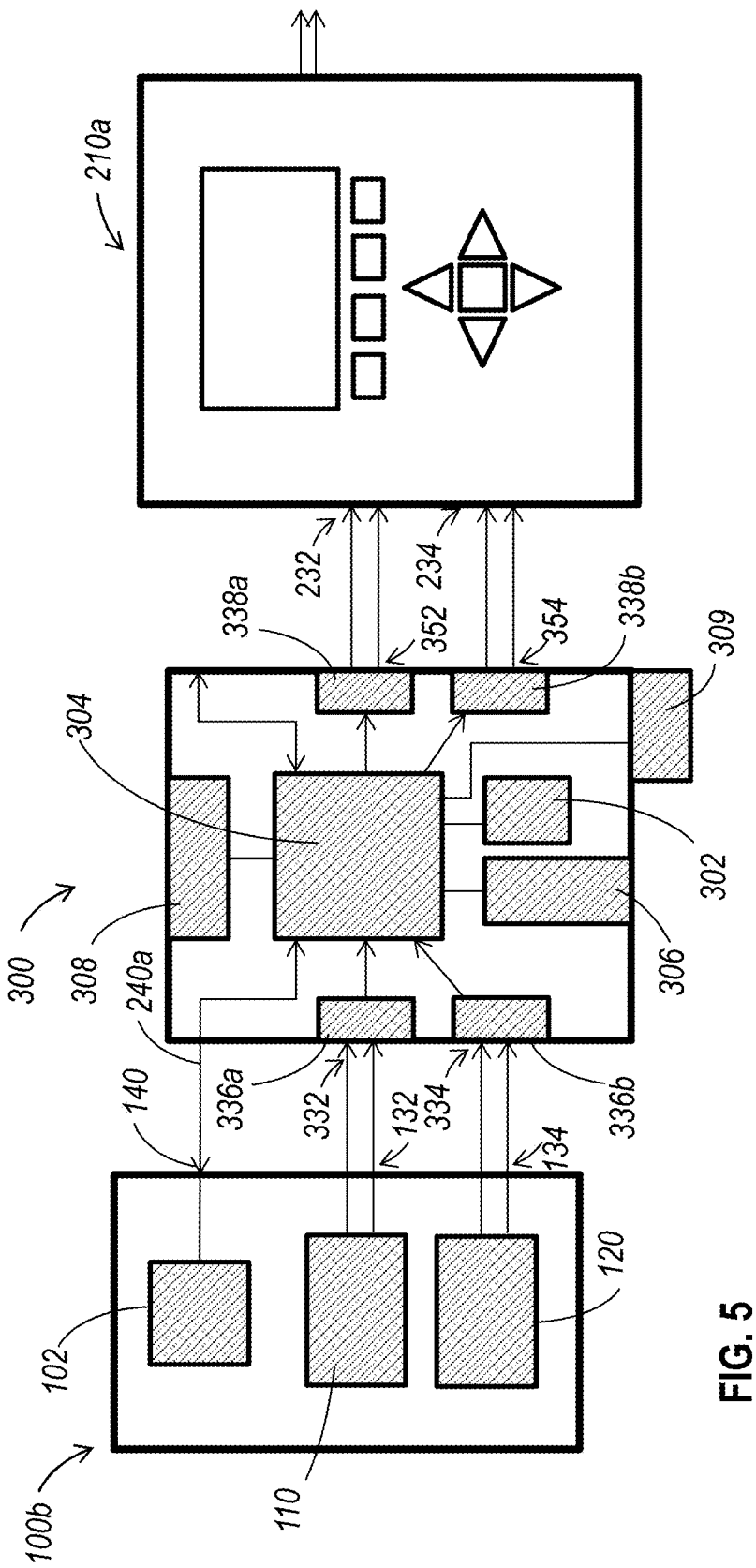
FIG. 5 schematically illustrates an embodiment of a system in which a measurement probe such as the hybrid smart probe of FIG. 2A is used in conjunction with a transmitter such as the transmitter of FIG. 1A.

FIG. 5 schematically illustrates an embodiment in which an interface device is used in conjunction with a hybrid smart probe such as the hybrid smart probe of FIG. 2A and a transmitter such as the transmitter of FIG. 1B. The hybrid smart probe 100*b* provides a first analog output signal via the first analog output 132 corresponding to the output of the principal measurement sensor 110 and a second analog output signal via the second analog output 134 corresponding to the output of the RTD sensor or other temperature sensor 120. Calibration data stored in memory circuit 102 is also provided via digital port 140. The analog output signals from the hybrid smart probe 100*b* are not yet corrected based on the calibration data of the smart probe.

The interface device 300 receives the first analog output signal via first analog input 332 and converts it to a digital signal using ADC 336*a*, and receives the second analog output signal via second analog input 334 and converts it to a digital signal using ADC 336*b*. Both converted signals are received by the processor 304 for further signal transformation. The calibration data from the probe is also received by the processor 304, and the processor 304 transforms the digitized output signals to generate digital signals using at least the calibration data to produce measurement values with zero offset and ideal span or slope. The first calibrated digital signal representing measurement values with zero offset and ideal span is converted to a corresponding analog output signal via DAC 338*a* and is output to the transmitter 210*a* via analog output 332, and the second calibrated digital signal is converted to a corresponding analog output signal via DAC 338*b* and output via analog output 332. In the case of a potentiometric sensor, the calibrated analog output has zero offset and a theoretically ideal span.

However, the transmitter contains the offset and span setting from the previous probe it was used with. Accordingly, when the probe's calibrated analog signals are received from the interface device, the transmitter applies these "last-used" offset and span settings to the received calibrated signal in its own calibration process and in so doing the transmitter corrupts the calibrated sensor signal, resulting in erroneous measurements being displayed and transmitted by the transmitter to a process controller. In addition, the transmitter 210*a* does not have any way of communicating the transmitter settings for sensor offset and span or slope to either the interface device 300 or the hybrid smart probe 100*b*. The interface device can provide a calibrated output signal, where the probe calibration data is used to calibrate the output signal to an ideal scale with zero offset and perfect span. However, such a perfectly-calibrated signal will only provide accurate information to the transmitter if the transmitter is configured to receive a perfectly-calibrated signal, and contains no previous offset and span settings from the last probe it was used with. In many cases it may be impractical for the user to change these previous transmitter calibration settings. In such cases, the interface device's output signal may simulate the offset and span that matches the as-found calibration settings in the transmitter, essentially emulating the response of the last-connected probe, so that the calibration performed by the transmitter will result in accurate measurements being made at the transmitter. In order to obtain accurate measurements using a transmitter 210*a*, regardless of the transmitter settings, the interface device 300 includes additional components which can be used to identify and correct for the transmitter 210*a* settings based on the response of the transmitter 210*a* to signals indicative of known values.

In particular, the interface device 300 also includes a signal generator 308 in communication with the processor 304. The signal generator 308 can be used to generate, among other signals, simulated signals corresponding to exposure of a sensor to known conditions. For example, in an embodiment in which the hybrid smart probe 100*b* is configured for operation as a pH sensor, the signal generator can be used to generate a signal corresponding to exposure of a perfectly calibrated pH sensor to a pH of a given value, such as a pH of 7.0. The resulting measurements at the transmitter 210*a* can be observed or recorded and used by the processor 304 to determine the calibration settings of the transmitter 210*a*. With the calibration data for the hybrid smart probe 100*b* and the transmitter 210*a* known, the processor 304 and signal generator 308 can generate emulated signals based on the received analog signals from the hybrid smart probe 100*b* which may be perfectly calibrated for the combination of the hybrid smart probe 100*b* and the existing transmitter 210*a*.

In one embodiment, the transmitter offset and span settings can be determined by sequentially generating a plurality of simulated sensor signals using the interface device, providing those signals to the transmitter, and recording the measurements at the transmitter corresponding to each of the plurality of simulated signals. For a sensor configured to have substantially linear response over a specific range of conditions, the plurality of simulated signals may include two simulated signals. While any two simulated signals can be used, the use of signals corresponding to substantially different conditions may allow for more accurate calculation of the transmitter's offset and span settings. In some embodiments, more than two signals can be used, and a best fit calculation or similar calculation may be used in the calculation of the transmitter offset and span settings.

Once the transmitter offset and span settings are known, both the sensor calibration data and the transmitter calibration settings may be used to calibrate and correct the interface device's output to an output signal which simulates the offset and span expected by the transmitter. In one embodiment, the interface device processor may utilize both the sensor offset and span calibration data and the transmitter offset and span settings to transform the sensor's raw output signal into an interface device output signal for output to the transmitter, where the interface device's output signal is calibrated and corrected to simulate a sensor with offset and span that match the as-found calibration settings in the transmitter. This will result in an accurate display at the transmitter of the measured parameter and an accurate transmission of the measurement to the process control system.

In one embodiment, the signal can first be calibrated by the interface device using the sensor offset and span calibration data to a calibrated signal having an ideal offset and an ideal span as defined by the engineering units of interest of the type of sensor in use. The calibrated signal may then be further transformed into a transmitter-appropriate emulated signal using the discovered and now known transmitter offset and span settings. In other embodiments, a single algorithm may be used to transform the raw signal from the sensor into an emulated signal completely calibrated to the "as-found" scale of the paired transmitter.

In this way the interface device adjusts the scale of the sensor signal output to emulate the scale that the transmitter expects and for which the transmitter calibration settings are correct., After this adjustment, the calibrated signal from the probe will be accurately displayed by the transmitter and accurately transmitted to the process controller. The interface device can therefore be used, in addition to conditioning received signals, to emulate sensor signals necessary for accurate measurement by a transmitter using the as-found calibration settings of the transmitter.

Figure 8C:
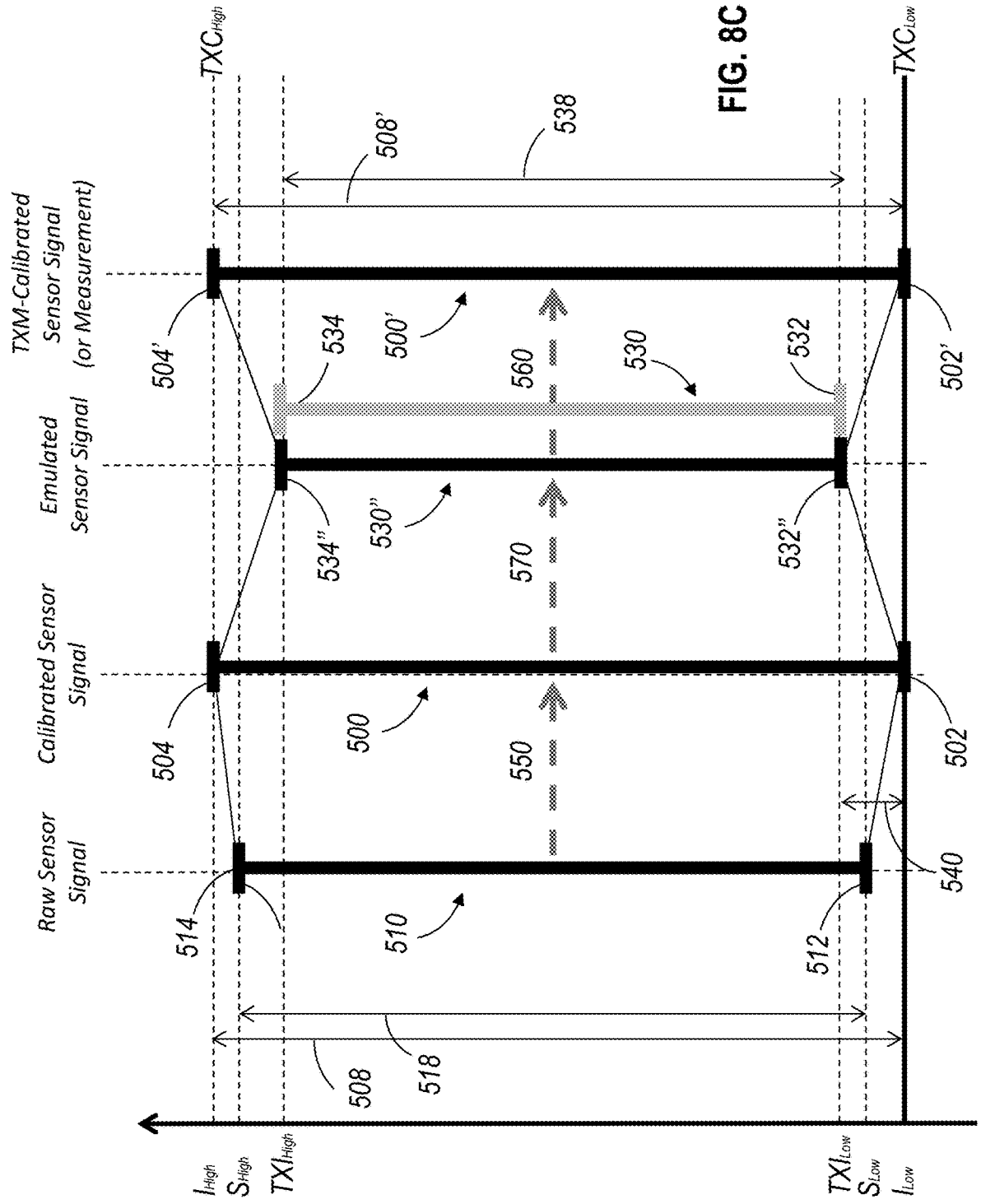
FIG. 8C is a representation of the transformation of a calibrated signal to an emulated signal which will provide an accurate measurement when received by a transmitter calibrated for an imperfect signal.

FIG. 8C is a representation of the transformation, using an interface device, of a raw sensor signal to an emulated interface device output signal which will provide an accurate measurement when received by a transmitter with "as-found" offset and span calibration settings. As discussed with respect to FIG. 8B, the transmitter is calibrated for the response 530 of an as-found sensor, such as a sensor of the previously-connected probe. For a transmitter configured for at least one of a non-zero offset and an imperfect span, the sensor response 530 differs from the scale of the idealized response 500. In particular, the as-found transmitter settings are configured to calibrate, convert, or otherwise correlate output signals from a previously-connected probe with response 530 to a transmitter-calibrated signal at an idealized measurement scale 500' in a conversion process 560. In order to ensure that the idealized measurement scale 500' is consistent with the idealized response 500, an emulation process 570 is used to convert or calibrate the idealized response 500 of an ideally-calibrated sensor signal to provide an emulated output signal calibrated to the response 530 of the transmitter as found.

In some embodiments, the interface device may perform a first conversion process 550 calibrating the raw sensor signal according to sensor output scale 510 to calibrated sensor signal or value according to idealized response scale 500, and then perform an emulation process 570 to generate or otherwise provide a sensor signal response 530' emulating the raw sensor signal from a sensor having a response 530, such that the emulated signal response 530' emulates the response 530 for which the transmitter is calibrated. In other embodiments, the conversion processes 550 and 570 may be combined into a single step, in which the raw sensor signal is converted to an emulated signal response 530' or value emulating the response 530 for which the transmitter is calibrated.

In addition to providing emulated output signals which take into account the calibration data of the hybrid smart probe 100*b* and the existing transmitter 210*a*, the processor 304 of the interface device 300 can also condition the signal received from the smart probe in other ways. For example, the digitized signals may be conditioned to remove noise and isolate or otherwise filter the signal. In some embodiments, the impedance of the signal can be reduced. In some embodiments the principal measuring sensor output signal can be temperature corrected. The processor 304 may also be used in an initializing or corrective process by comparing the actual output of the sensor to the expected output when exposed to a known condition, such as a particular temperature or pH. Initial or updated calibration data can be generated and written back to the sensor.

In some embodiments, the interface device may generate a plurality of signals to be output to the transmitter. As the transmitter receives each signal, it displays a measurement value. These displayed values are inputted into the interface device by an operator. The interface device can then analyze the displayed values from the transmitter with the known value of the interface device's simulated output signal and then calculate the transmitter's offset and span settings. Once these transmitter settings are calculated and known by the interface device and combined with the calibration data of the probe, the interface device can calibrate the scale of the probe's signal output to emulate a scale that matches the transmitter's as-found and as-discovered calibration settings. In this way the interface device calibrates the sensor signal from the probe to be correctly and accurately displayed by the transmitter and transmitted to the process controller. No adjustment of the transmitter is necessary. In some embodiments, the calibration data may include offset and span values of the connected sensor, although other types of calibration data may also be used for other sensors, such as lookup tables.

Once an interface device has been used to determine the transmitter settings, the pairing process between the interface device and the transmitter does not need to be repeated, as the transmitter settings for that transmitter have already been discovered. Any number of smart probes having their own calibration data can be subsequently connected to the interface device and automatically calibrated with the transmitter. After the interface device is paired to the transmitter, any subsequent hybrid or smart sensor signals can be automatically reformed as emulated signals with response 530'. Thus, the interface device allows users to benefit from the functionality of connected smart probes, receiving calibration information and other metadata from some embodiments of smart probes or ideal calibrated signals from other embodiments of smart probes. At the same time, the interface device will provide an emulated signal to the transmitter which allows for accurate measurement at a legacy transmitter having as-found settings even when those transmitters are not configured to receive the perfectly calibrated signals which can be received from smart probes or generated using smart probe calibration data. Such smart probes may be calibrated at a remote location and installed in the field by personnel who do not have to perform or even be aware of sensor calibration processes.

Figure 6:
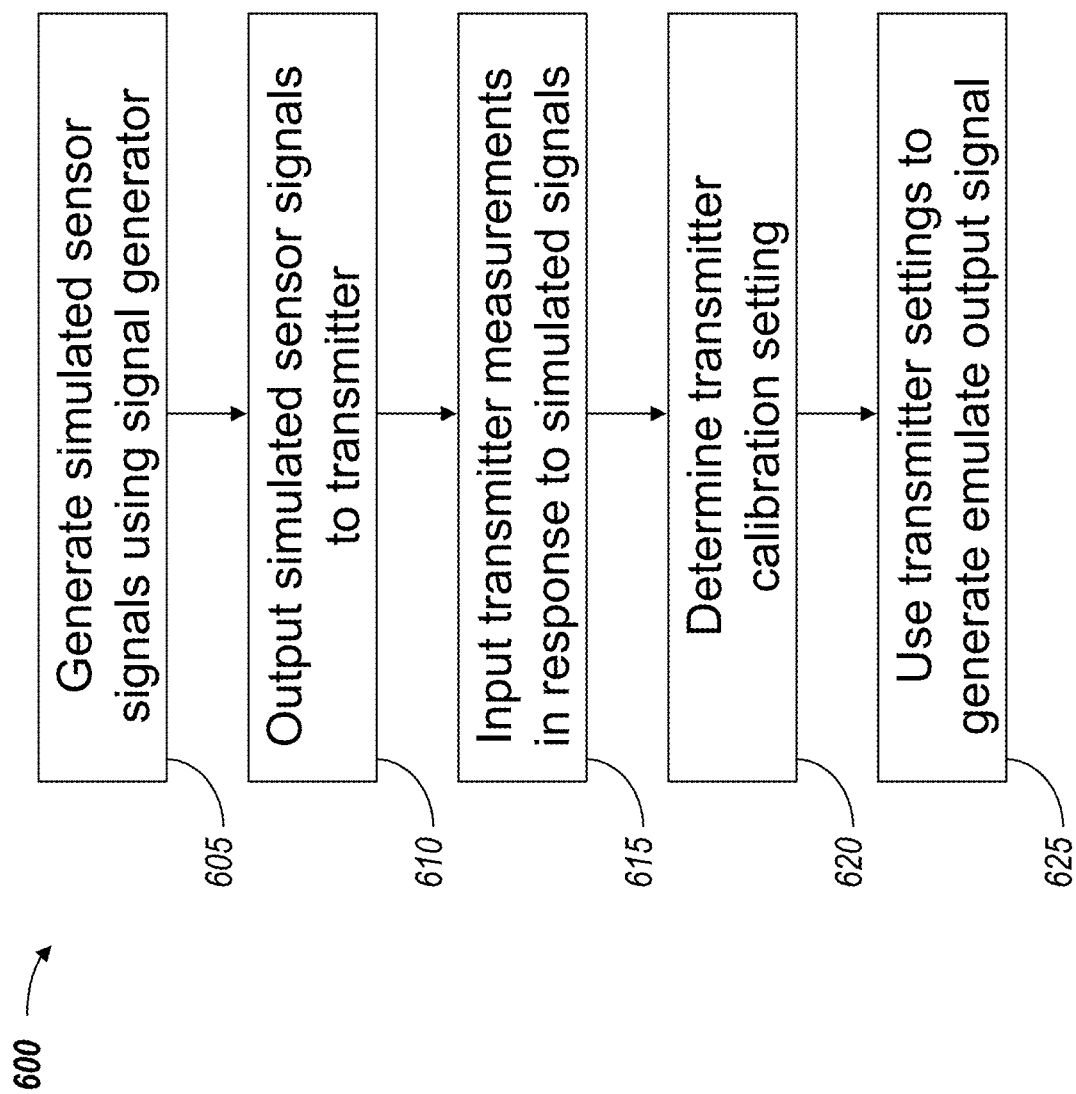
FIG. 6 is a flow diagram describing an embodiment of an interrogation process for calculation of transmitter calibration data.

FIG. 6 is a flow diagram describing an embodiment of an interrogation process 600 for calculation of transmitter calibration data. The process 600 begins at a block 605, where a signal simulator within an interface device generates one or more precise simulated value sensor signal outputs to the transmitter.

The generation of simulated signals that result in transmitter display data may be controlled by a separate computing device in communication with the interface device. For example, a smartphone in wireless communication with the interface device may be used in the interrogation process 600. The smartphone or other separate computing device may be used to select or modify the simulated signals, as well as trigger the generation and output of those signals. In some embodiments, the interface device may retrieve probe metadata from the measurement probe, and communicate such metadata to the smartphone or other computing device. This probe metadata can in turn be used in the selection and generation of appropriate simulated signals. For example, the smartphone or other computing device may suggest a plurality of suitable simulated signals for a given probe based upon the probe metadata. The smartphone or other computing device may also display probe information to the user. In other embodiments, the interface device may include integrated controls which allow for selection and/or control of signal generation. The amount of control may vary in various embodiments, from allowing precise control over simulated signals to simply triggering an interrogation procedure which is at least partially predefined or otherwise automated.

The process 600 then moves to a block 610, where the simulated sensor signal value is output to a connected transmitter, to interrogate the transmitter. This transmission may involve the conversion of a digital signal to an analog signal before the signal is sent from the interface device, and the transmitter may receive the signal via one or more analog inputs. The transmitter will generate a measurement value in engineering units in response to the received signal and display that value.

The process then moves to a block 615 where information indicative of the measured and displayed value at the transmitter is provided as an input to the processor 304 of the interface device 300. In some embodiments, this information may be recorded and entered into a separate control device in communication with the processor, such as a smartphone wirelessly connected to the interface device. In other embodiments, however, other types of control devices may be used, and the connections may be wired instead of wireless. In some embodiments, the transmitter measurement data may be manually inputted into the control device and transmitted to the interface device, while in other embodiments the capture of the measurement data may be more automated, such as, having the transmitter measurement data electronically inputted from an existing digital output from the transmitter.

If the displayed measurement value differs from expected value for that specific simulated sensor signal value, the transmitter must possess legacy calibration settings, and the interface device must take these transmitter calibration settings into account in order to emulate an appropriate sensor signal in such a manner that the resulting measurements will be displayed accurately on the transmitter display and, in-turn, be re-transmitted correctly by the transmitter.

In some embodiments, the steps described with respect to blocks 605 to 615 may be repeated for multiple known sensor values, and for signals from various sensors within the measurement probe. In some embodiments, the steps described with respect to blocks 605 to 615 may be performed for at least two simulated signals, where the first signal corresponds to the zero value of the sensor's raw measurement and where the second signal corresponds to a sensor measurement with a non-zero value of the sensor's raw measurement.

In some embodiments, the interface device may generate a simulated output signal corresponding to a particular condition and gradually alter the calibration settings applied to the simulated output signal until the engineering value calculated at the transmitter corresponds to the condition for which the simulated signal was generated. This process may be repeated for one or more additional output signals, and the results used to determine the transmitter calibration settings based on the calibration settings applied when the transmitter measurement is aligned with the simulated signal condition.

The process then moves to a step 620 where at least one transmitter calibration setting is determined by the processor. The transmitter offset value can be calculated as discussed above. When the applied signal corresponds to an ideal sensor value at a known pH, the difference in the measured value at the transmitter will be equal to the transmitter offset setting. For example, in one embodiment the ideal raw millivolt signal from a pH sensor is 0 mV at 7.0 pH. If the displayed transmitter value is something other than 7.00 pH, the transmitter's offset setting can be calculated. The span setting of the transmitter can be calculated similarly. Once the offset is known, a second signal is applied that corresponds to an ideal sensor value that is several pH units away from the first applied value. The resulting value that is displayed by the transmitter can then be used to calculate the span setting in the transmitter. Note that the span and offset values of the transmitter can be calculated using any two simulated signals, and may be calculated using a variety of appropriate testing or interrogation methods.

The calculation of the transmitter settings need not be done by the processor 304. In some embodiments, the transmitter settings may be calculated by a control device such as a smartphone or tablet in wireless communication with the interface device. In such embodiments, the calculated transmitter settings may be transmitted to the processor 304 for use in conditioning signals received from the smart probe, rather than transmitting the raw transmitter readings, or other information indicative of the raw transmitter readings. Calculation of the transmitter settings at the control device, rather than in the interface device itself, may allow some processing to be offloaded to a different device, and may allow the calculation process to be updated if needed, as software executed on a smartphone or tablet may be updated more easily than programming or firmware of the interface device.

Similar transmitter interrogation processes may be performed for other sensor types, and can be used to identify other types of transmitter settings. In some embodiments, transmitter measurements may be altered via transmitter settings which do not simply modify the offset, span, or other parameter of the linear response. For example, in some embodiments, a transmitter setting may be manually set to a fixed value. If the transmitter is manually set to reflect a fixed temperature, rather than a temperature calculated in response to signals from a temperature sensor of a measurement probe, such a setting can be identified and accounted for via the same interrogation process. By generating and transmitting two separate signals indicative of different temperatures to the transmitter, a lack of change between the temperature transmitter readings is reflective of a manually locked transmitter measurement, as the transmitter measurement is unresponsive to changes in the corresponding output signal provided to the transmitter. Similarly, interrogation of a transmitter can be used to determine, for example, whether an RTD sensor is being measured in a Pt100 mode or a Pt1000 mode.

Finally, the process moves to a step 625 where the transmitter calibration data is used to calibrate the sensor output signals received by the interface device in conjunction with the sensor calibration data to provide an emulated signal to the transmitter which is calibrated to the expected input scale of the transmitter. The resulting measurement at the transmitter will be accurately displayed on the transmitter and can be accurately re-transmitted by the transmitter. The interface device therefore allows use of a smart probe in conjunction with a legacy transmitter without altering the as-found and pre-existing settings of the legacy transmitter. If a manual transmitter setting is overriding the output signals provided by a sensor, the interface device can also confirm this, and take that transmitter setting into account. The interface device may also provide a notification that the transmitter is set to be non-responsive to a given sensor input.

Figure 7:
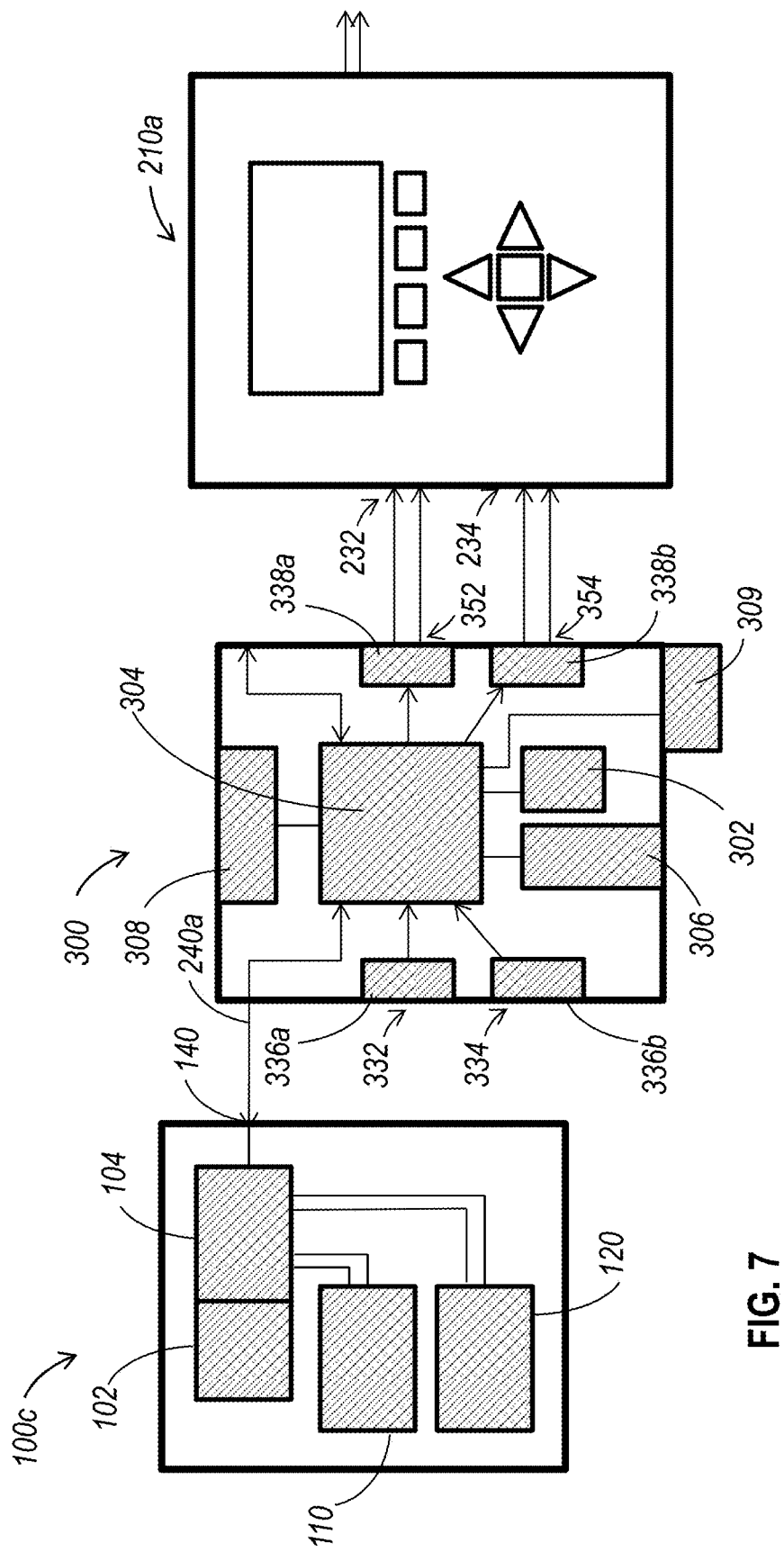
FIG. 7 schematically illustrates an embodiment of a system in which a measurement probe such as the smart probe of FIG. 3A is used in conjunction with a transmitter such as the transmitter of FIG. 1A.

FIG. 7 schematically illustrates an embodiment in which an interface device is used in conjunction with a smart probe such as the smart probe of FIG. 3A and a transmitter such as the transmitter of FIG. 1B. In contrast to the embodiment of FIG. 5, the smart probe 100*c* may be configured to provide a calibrated signal to the digital I/O port 340*a* of the interface device via the digital I/O port 140 of the smart probe 100*c*. The analog inputs 332 and 334 of the interface device need not be used, and the ADCs 336*a* and 336*b* will similarly be unused. In an embodiment in which the interface device 300 is a specialized interface device for use only with all-digital smart probes such as smart probe 100*c*, the analog inputs 300 and ADCs 336*a* and 336*b* need not be included in the interface device 300.

In addition to enabling a completely calibrated pairing of a smart probe with a legacy transmitter, the interface devices and transmitter interrogation techniques described herein can also be used as a diagnostic tool for transmitter maintenance. When the interface device includes a signal generator, the interface device can be used to interrogate a transmitter even without a corresponding sensor attached. The use of the interface device to output signals which are not derived from or otherwise based on actual sensor signals from a connected measurement probe may greatly reduce the time necessary for such diagnostics, as appropriate simulated sensor output signals can be generated directly, rather than by altering the conditions to which an actual sensor is exposed. These simulated sensor output signals can be generated independent of process conditions to which a measurement probe would be exposed.

In some embodiments, the measured transmitter settings may differ somewhat from the actual transmitter settings, due to defects within the transmitter or changes which occur over the lifetime of the transmitter. In such embodiments, the use of an interface device can be used to confirm and correct for such variances. By comparing the calculated transmitter settings with the actual transmitter settings, the existence and degree of any variance between the two can be determined.

In the foregoing description, specific details are given to provide a thorough understanding of the examples. However, it will be understood by one of ordinary skill in the art that the examples may be practiced without these specific details. Certain embodiments that are described separately herein can be combined in a single embodiment, and the features described with reference to a given embodiment also can be implemented in multiple embodiments separately or in any suitable subcombination. In some examples, certain structures and techniques may be shown in greater detail than other structures or techniques to further explain the examples.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An interface device for use with a measurement probe and a transmitter, the interface device comprising:
   at least one input configured to receive a sensor signal from a measurement probe;
   a processor configured to:
     generate a simulated sensor output signal for output to a transmitter;
     receive transmitter response information regarding the response of the transmitter to the simulated sensor output signal;
     determine, based on the transmitter response information, information regarding at least one transmitter setting; and
     generate an emulated sensor signal using the sensor signal and the information regarding the at least one transmitter setting, the emulated sensor signal configured to produce an accurate measurement at the transmitter without changing the at least one transmitter setting; and
   at least one output configured to output the simulated sensor output signal and the emulated sensor signal to the transmitter.

2. The device of claim 1, wherein the at least one transmitter setting comprises transmitter calibration information.

3. The device of claim 2, wherein the transmitter calibration information is indicative of an expected sensor response for which the transmitter is calibrated, the expected sensor response differing from an idealized sensor response in at least one of offset and span, and wherein the emulated output signal is calibrated to emulate the expected sensor response.

4. The device of claim 2, wherein the processor is additionally configured to:
   receive sensor calibration information from the measurement probe; and
   generate the emulated sensor signal using the sensor calibration information in addition to the sensor signal and the transmitter calibration information.

5. The device of claim 4, wherein the processor is additionally configured to:
   convert the sensor signal to a calibrated sensor signal using the sensor calibration information; and
   generate the emulated sensor signal by converting the calibrated sensor signal to the emulated sensor signal using the transmitter calibration information.

6. The device of claim 4, wherein the processor is further configured to convert the sensor signal to the emulated sensor signal using the sensor calibration information and the transmitter calibration information.

7. The device of claim 1, additionally comprising a communications module in communication with the processor, wherein the communications module comprises a wireless transceiver configured to communicate with a separate computing device, and wherein the communications module is configured to receive the transmitter response information from the separate computing device.

8. The device of claim 1, additionally comprising a communications module in communication with the processor, wherein the communications module comprises a wired connection configured to communicate with a separate computing device, and wherein the communications module is configured to receive the transmitter response information from the separate computing device.

9. The device of claim 1, wherein the transmitter response information comprises a plurality of transmitter measurements, each of the plurality of transmitter measurements in response to a different simulated output signal.

10. The device of claim 1, wherein the transmitter response information comprises user input indicative of whether the transmitter response accurately reflects the simulated sensor output signal.

11. The device of claim 1, wherein the emulated sensor signal is configured to produce an accurate measurement at the transmitter indicative of the sensor signal.

12. An interface device for interrogating a transmitter, the device comprising:
   a processor configured to:
     generate a plurality of simulated sensor output signals, each of the plurality of simulated sensor output signals corresponding to a different sensor condition; and
     determine at least one transmitter calibration condition based on information regarding the responses of a transmitter to each of the plurality of simulated output signals; and
   an output for transmitting each of the plurality of simulated output signals to the transmitter.

13. The device of claim 12, additionally comprising an input for receiving a sensor signal, wherein the processor is additionally configured to generate an emulated sensor signal based upon the at least one transmitter calibration condition, wherein the device is configured to transmit the emulated sensor output signal to the transmitter.

14. The device of claim 13, additionally comprising a second input for receiving sensor calibration data, wherein the module is configured to convert the sensor signal to a calibrated sensor signal based on the sensor calibration data and generate the emulated sensor signal by converting the calibrated sensor signal to the emulated sensor signal based upon the at least one transmitter calibration condition.

15. The device of claim 12, additionally comprising a transceiver for wirelessly receiving, from a separate computing device, the information regarding the responses of the transmitter to each of the plurality of simulated output signals.

16. The device of claim 12, wherein the information regarding the responses of the transmitter to each of the plurality of simulated output signals comprises transmitter measurements in response to each of the plurality of simulated output signals.

17. An interface device configured for use with a transmitter configured to convert a sensor signal to a calibrated sensor signal based on transmitter calibration information, the interface device comprising:
- a processor configured to generate an emulated sensor signal based on the transmitter calibration information, the emulated sensor signal having a non-ideal span such that conversion of the emulated sensor signal by the transmitter using the transmitter calibration information will result in a calibrated sensor signal having an ideal span; and
- an output configured to output the emulated sensor signal to the transmitter.

18. The device of claim 17, wherein the emulated sensor signal has a non-zero offset.

19. The device of claim 17, wherein conversion of the emulated sensor signal by the transmitter using the transmitter calibration information will result in a calibrated sensor signal calibrated to an idealized response.

20. The device of claim 17, wherein the emulated sensor signal is calibrated to an expected input scale of the transmitter.

\* \* \* \* \*